United States Patent
Hwang et al.

(10) Patent No.: US 8,189,948 B2
(45) Date of Patent: May 29, 2012

(54) METHOD AND SYSTEM FOR IMAGE RESTORATION USING FREQUENCY-BASED IMAGE MODEL

(75) Inventors: Won Jun Hwang, Seoul (KR); Gyu-tae Park, Anyang-si (KR); Moon-Sik Jeong, Seongnam-si (KR); Dong-Keun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 978 days.

(21) Appl. No.: 12/216,705

(22) Filed: Jul. 9, 2008

(65) Prior Publication Data
US 2009/0180705 A1 Jul. 16, 2009

(30) Foreign Application Priority Data

Jan. 15, 2008 (KR) ........................ 10-2008-0004536

(51) Int. Cl.
*G06K 9/40* (2006.01)
*G06K 9/00* (2006.01)
(52) U.S. Cl. ........ 382/266; 382/260; 382/274; 382/275; 382/100
(58) Field of Classification Search .................. 382/260, 382/275, 274, 100, 266
See application file for complete search history.

(56) References Cited

U.S. PATENT DOCUMENTS

| | | | | |
|---|---|---|---|---|
| 5,757,974 A * | 5/1998 | Impagliazzo et al. | ........ | 382/248 |
| 6,289,131 B1 * | 9/2001 | Ishikawa | ........ | 382/240 |
| 6,611,618 B1 * | 8/2003 | Peli | ........ | 382/154 |
| 2003/0128886 A1 * | 7/2003 | Said | ........ | 382/248 |
| 2003/0218776 A1 * | 11/2003 | Morimoto et al. | ........ | 358/2.1 |
| 2010/0246952 A1 * | 9/2010 | Banner et al. | ........ | 382/167 |

OTHER PUBLICATIONS

Yi-Ching Liaw, Winston Lo, Jim Z.C. Lai, Image Restoration of compressed image using classified vector quantization. Pattern Recognition 35(2002) p. 329-340.*

Ryo Nakagaki and Aggelos K. Katsaggelos,"A VQ-Based Image Restoration Algorithm" Image Processing 2002 Proceedings, pp. I-305 to I-308 vol. 1. Dec. 10, 2002.*

Kawano H. et al., "Super-resolution via matching from Self-decomposed Codebook with Local Distance Measure Incorporating Pixel Correlation", Proceedings-Digital Image Computing Techniques and Applications: 9th Biennial Conference of the Australian Pattern Recognition Society, DICTA 2007, Proceedings-Digital Image Computing Techniques and Applications, 2007, pp. 317-323.

(Continued)

*Primary Examiner* — Vu Le
*Assistant Examiner* — Ha Le
(74) *Attorney, Agent, or Firm* — Staas & Halsey LLP

(57) ABSTRACT

A method and system of restoring an image using a frequency-based image model is provided. A method of restoring an image using a frequency-based image model, the method including: transforming an original image into a frequency domain and generating a transformation image; copying the transformation image in any one domain of domains in which the original image is extended and which are divided into blocks; and inferring a high frequency component of block domains, and restoring the block using the transformation image copied in the any one domain.

14 Claims, 18 Drawing Sheets

OTHER PUBLICATIONS

Jiji C. V. et al., "Single Frame Image Super-Resolution: Should We Process Locally or Globally?", Multidimensional Systems and Signal Processing: An International Journal, Kluwer Academic Publishers, 80, vol. 18, No. 2-3, Mar. 6, 2007, pp. 123-152.

Ni K. S. et al., "Single Image Superresolution Based on Support Vector Regression", Acoustics, Speech and Signal Processing, 2006, ICASSP 2006 Proceedings, 2006 IEEE International Conference on Toulouse, France, May 14-19, 2006, Piscataway, NJ, vol. 2, May 14, 2006, pp. II-601.

Kawano H. et al., "Super-resolution via matching from Self-decomposed Codebook with Local Distance Measure Incorporating Pixel Correlation", Proceedings-Digital Image Computing Techniques and Applications: 9th Biennial Conference of the Australian Pattern Recognition Society, DICTA 2007, Proceedings-Digital Image Computing Techniques and Applications, 2007, pp. 317-323.

Liu C. et al., "A Two-Step Approach to Hallucinating Faces: Global Parametric Model and Local Nonparametric Model", Proceedings 2001 IEEE Conference on Computer Vision and Pattern Recognition, CVPR 2001, Kauai, Hawaii, Dec. 8-14, 2001, Los Alamitos, CA, vol. 1, Dec. 8, 2001.

Nakagaki R. et al., "A VQ Based Image Restoration Algorithm", IEEE ICIP 2002, Sep. 22, 2002, pp. 305-308.

European Search Report issued Dec. 5, 2009 in corresponding European Patent Application 08160094.2.

* cited by examiner

METHOD AND SYSTEM FOR IMAGE RESTORATION USING FREQUENCY-BASED IMAGE MODEL

CROSS-REFERENCE TO RELATED APPLICATIONS

This application claims the benefit of Korean Patent Application No. 10-2008-0004536, filed on Jan. 15, 2008, in the Korean Intellectual Property Office, the disclosure of which is incorporated herein by reference.

BACKGROUND

1. Field

The present invention relates to a method and system of restoring an image using a frequency-based image model, and more particularly, to a method and system of restoring an image using a frequency-based image model which can restore a low-resolution image into a high-resolution image.

2. Description of the Related Art

A technology of restoring a low-resolution image into a high-resolution image is used for an apparatus for facial recognition by restoring a low-resolution image of a human face into a high-resolution image of a human face since human faces photographed in a surveillance image are generally small and visually unidentifiable, an apparatus for restoring a broadcast image received at a low resolution in a digital television (DTV) into a high-resolution image, an apparatus for magnifying a military satellite photograph, and the like. Also, when a user intends to a desired portion from among images photographed by a digital camera, the digital camera uses a method of restoring a low-resolution image into a high-resolution image.

A high-resolution restoration method denotes a method of restoring the low-resolution image into the single high-resolution image basically using a low-resolution image pixel of each of a plurality of low-resolution images. The above-described method compensates for insufficient pixel information during restoration into the high-resolution image from a plurality of other low-resolution images. The high-resolution method typically includes Schultz's method, and Schultz's method is used for viewing a clear image by improving a picture quality of the image when viewed on TV. Basically, the low-resolution image is magnified as much as desired using a well-known interpolation method (for example, bi-cubic, and the like), and restoration of a portion inadequately reproduced in the magnified portion is performed using Bayesian Rule based on the plurality of low-resolution images.

SUMMARY

Additional aspects and/or advantages will be set forth in part in the description which follows and, in part, will be apparent from the description, or may be learned by practice of the invention.

An aspect of the present invention provides a method and system of restoring an image using a frequency-based image model which can restore a low-resolution facial image into a high-resolution facial image even when a security camera photographs a facial image at a long distance and facial recognition may not be accomplished using the photographed facial image.

An aspect of the present invention also provides a method and system of restoring an image using a frequency-based image model which can be resistant to noise, be resistant to a characteristic change of an input image, eliminate discontinuity among blocks shown in a conventional art, and sequentially infer a high frequency component, thereby restoring the image into a high-quality high-resolution image.

According to an aspect of the present invention, there is provided a method of restoring an image using a frequency-based image model, the method including: transforming an original image into a frequency domain and generating a transformation image; copying the transformation image in any one domain of domains in which the original image is extended and which are divided into blocks; and inferring (deducing) a high frequency component (of remaining) block domains (excluding the any one domain), and restoring the block using the transformation image copied in the any one domain.

In an aspect of the present invention, the inferring and restoring infers the high frequency component of the remaining block domains (excluding the any one domain), and restores the block using a low frequency component of the transformation image.

In an aspect of the present invention, the method further includes: eliminating frequency distortion noise that occurs when copying the original image transformed into the frequency band, in the extended domain being divided into the blocks.

In an aspect of the present invention, the inferring and restoring infers the high frequency component of the remaining block domains excluding the any one domain, and restores the block based on information found by searching for a value closest to an input vector of the transformation image from a database.

In an aspect of the present invention, the inferring and restoring includes: inferring a high frequency component of a block domain located in a horizontal direction based on the transformation image, and restoring the block; inferring a high frequency component of a block domain located in a vertical direction based on the transformation image, and restoring the block; and inferring a high frequency component of a block domain located in a diagonal direction based on the transformation image using the high frequency components of the block domains located in the horizontal direction and the vertical direction, and restoring the block.

In an aspect of the present invention, the method further includes: inferring the high frequency component of the remaining block domains using the restored block domain by replacing at least one of a basis vector and a face model, and restoring the block.

In an aspect of the present invention, the inferring of the high frequency component of the remaining block domains using the restored block domain includes: inferring a high frequency component of a block domain located in a horizontal direction based on the transformation image, and restoring the block; inferring a high frequency component of a block domain located in a vertical direction based on the transformation image, and restoring the block; and inferring a high frequency component of a block domain located in a diagonal direction based on the transformation image using the high frequency components of the block domains located in the horizontal direction and the vertical direction, and restoring the block.

In an aspect of the present invention, a computer-readable recording medium stores a program for implementing the method according to any one of the above-described methods.

According to another aspect of the present invention, there is provided a system for restoring an image using a frequency-based image model, the system including: an image transformation unit to transform an original image into a frequency band and generate a transformation image; an image copying unit to copy the transformation image in any one domain of domains in which the original image is extended and in which are divided into blocks; and an image restoration unit to infer a high frequency component of remaining block domains excluding the any one domain, and restore the block using the transformation image copied in the any one domain.

In an aspect of the present invention, the image restoration unit infers the high frequency component of the remaining block domains excluding the any one domain, and restores the block using a low frequency component of the transformation image.

In an aspect of the present invention, the system further includes: a noise elimination unit to eliminate frequency distortion noise that occurs when copying the original image transformed into the frequency band, in the extended domain being divided into the blocks.

In an aspect of the present invention, the image restoration unit infers the high frequency component of the remaining block domains excluding the any one domain, and restores the block based on information found by searching for a value closest to an input vector of the transformation image from a database.

In an aspect of the present invention, the image restoration unit infers a high frequency component of a block domain located in a horizontal direction based on the transformation image, and restores the block, infers a high frequency component of a block domain located in a vertical direction based on the transformation image, and restores the block, and infers a high frequency component of a block domain located in a diagonal direction based on the transformation image using the high frequency components of the block domains located in the horizontal direction and the vertical direction, and restores the block.

In an aspect of the present invention, the image restoration unit infers the high frequency component of the remaining block domains using the restored block domain by replacing at least one of a basis vector and a face model, and restores the block.

In an aspect of the present invention, the image restoration unit infers a high frequency component of a block domain located in a horizontal direction based on the transformation image, and restores the block, infers a high frequency component of a block domain located in a vertical direction based on the transformation image, and restores the block, and infers a high frequency component of a block domain located in a diagonal direction based on the transformation image using the high frequency components of the block domains located in the horizontal direction and the vertical direction, and restores the block.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
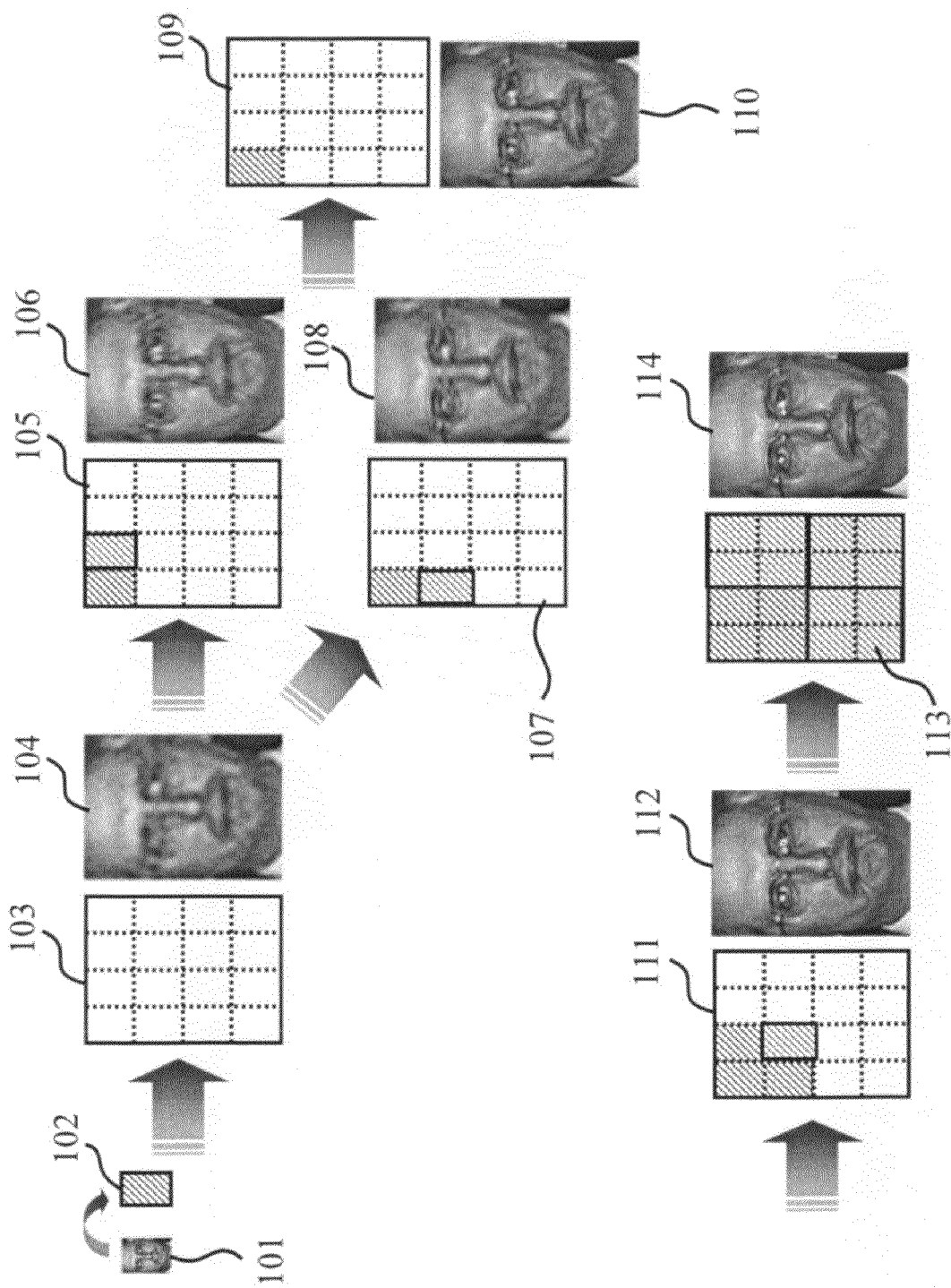
FIG. 1 illustrates a method of restoring an image using a frequency-based image model according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a method of restoring an image using a frequency-based image model according to an exemplary embodiment of the present invention. FIG. 1 illustrates a process of transforming the image into a frequency band and sequentially restoring the image.

Specifically, as illustrated in FIG. 1, although the method of restoring the image according to the present exemplary embodiment of the present invention does not divide the image itself into blocks, the method does divides the frequency band into blocks, and then restores the image after transforming the image into the frequency band using Discrete Cosine Transform (DCT), Fourier Transform (FT), and the like. In this instance, the method assumes an input image as a low frequency component and sequentially restores a remaining high frequency component.

When the method is described in detail with reference to FIG. 1, after an image 102 transformed from an input image 101 into the frequency band is generated, images 103 and 104 of extending the frequency band are acquired. Images 105 and 106 of inferring the frequency band in a horizontal direction from a reference block are subsequently acquired, images 107 and 108 of inferring the frequency band in a vertical direction from the reference block are generated, and images 109 and 110 close to the original image are acquired.

Images 111 and 112 of inferring the frequency band in a diagonal direction from the reference block are acquired based on the frequency band inferences in the horizontal direction and the frequency band inferences in the vertical direction. Ultimately, final reference images 113 and 114 are generated using frequency band inferences of remaining blocks and restoration is completed.

Figure 2:
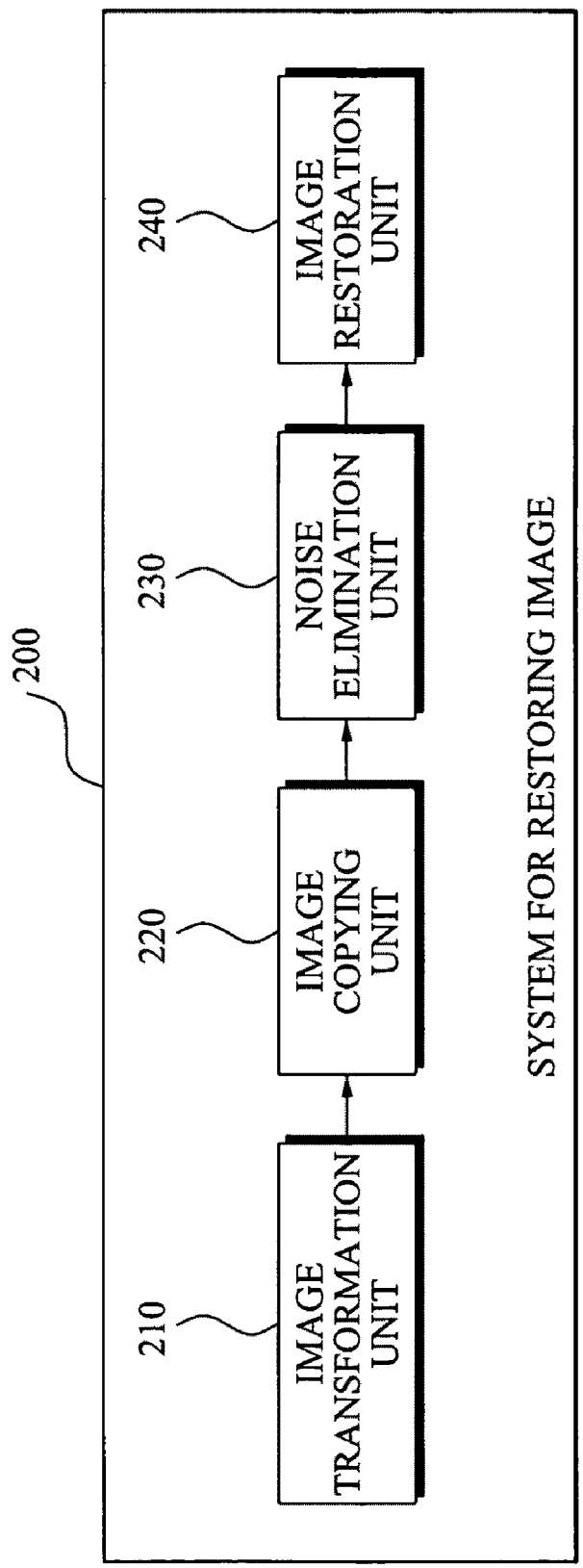
FIG. 2 is a configuration diagram illustrating a system for restoring an image according to an exemplary embodiment of the present invention.

FIG. 2 is a configuration diagram illustrating a system 200 for restoring an image according to an exemplary embodiment of the present invention. Referring to FIG. 2, the system 200 for restoring the image according to the present exemplary embodiment of the present invention is described.

As illustrated in FIG. 2, the system 200 for restoring the image according to the present exemplary embodiment of the present invention includes an image transformation unit 210, an image copying unit 220, a noise elimination unit 230, and an image restoration unit 240.

The image transformation unit 210 transforms an original image into a frequency band and generates a transformation image. In this instance, the image copying unit 220 copies the transformation image in any one domain of domains in which the original image is extended and which are divided into blocks.

The noise elimination unit 230 eliminates frequency distortion noise that occurs when copying the original image transformed into the frequency band, in the extended domain being divided into the blocks.

The image restoration unit 240 may infer a high frequency component block domains, and restores the block using the transformation image copied in the any one domain. The image restoration unit 240 also may infer a high frequency component of remaining block domains excluding the any one domain, and restores the block using the transformation image copied in the any one domain.

The image restoration unit 240 may infer the high frequency component block domains, and restores the block using a low frequency component of the transformation image. Or, the image restoration unit 240 may infers the high frequency component of the remaining block domains excluding the any one domain, and restores the block using a low frequency component of the transformation image.

In this instance, the image restoration unit 240 infers the high frequency component of the remaining block domains excluding the any one domain, and restores the block based on information found by searching for a value closest to an input vector of the transformation image from a database. According to an aspect of the present invention, the image restoration unit 240 may infer the high frequency component of the remaining block domains, and restores the block based on information found by searching for a value closest to an input vector of the transformation image from a database.

Also, the image restoration unit 240 infers a high frequency component of a block domain located in a horizontal direction based on the transformation image, and restores the block, infers a high frequency component of a block domain located in a vertical direction based on the transformation image, and restores the block, and infers a high frequency component of a block domain located in a diagonal direction based on the transformation image using the high frequency components of the block domains located in the horizontal direction and the vertical direction, and restores the block.

Also, the image restoration unit 240 infers the high frequency component of the remaining block domains using the restored block domain by replacing at least one of a basis vector and a face model, and restores the block. Using the above-described process, an adjacent block to a reference block, a block located in a diagonal direction from the reference block, and a block of a wide remaining portion of the image may be inferred and the blocks may be restored.

Figure 3:
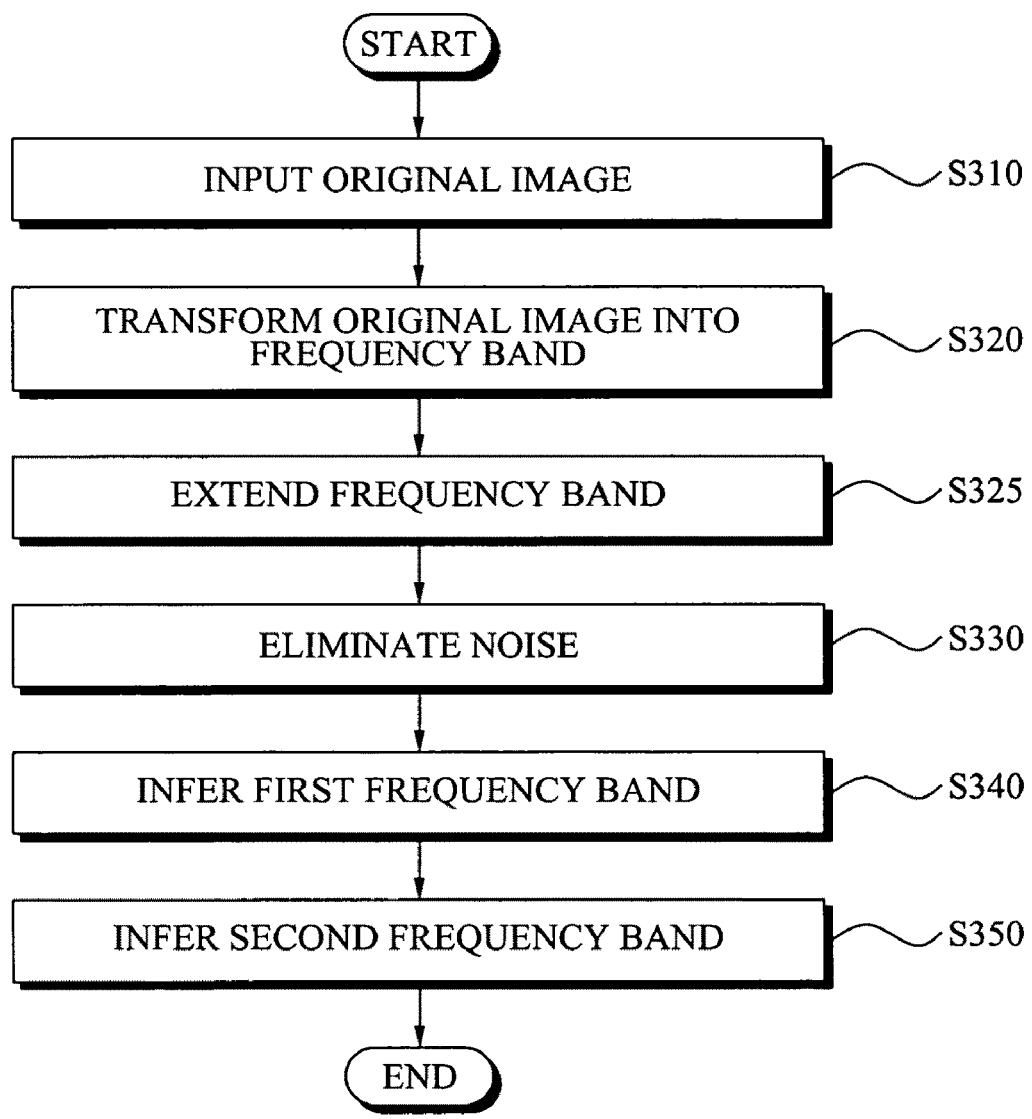
FIG. 3 is a flowchart illustrating a method of restoring an image using a frequency-based image model according to an exemplary embodiment of the present invention.

FIG. 3 is a flowchart illustrating a method of restoring an image using a frequency-based image model according to an exemplary embodiment of the present invention. Referring to FIG. 3, the method of restoring the image using the frequency-based image model according to the present exemplary embodiment of the present invention is described.

As illustrated in FIG. 3, when an original image is inputted in operation S310, the original image is transformed into a frequency band and a transformation image is generated in operation S320.

In this instance, the original image is a low-resolution image, and when a size of the image and an extension ratio are found, the generated face model may be selected, and frequency band transformation of the original image, that is, the low-resolution image in a spatial domain is transformed into a frequency domain using DCT, FT, and the like.

Figure 6:
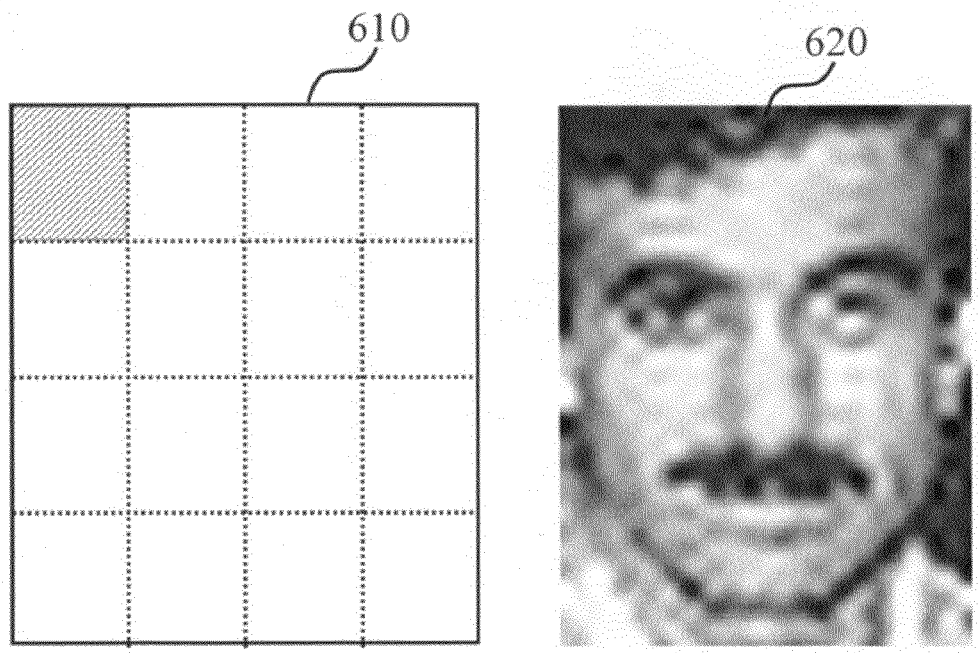
FIGS. 6 through 8 illustrate a method of restoring an image using a frequency-based image model according to an exemplary embodiment of the present invention.

In operation S325, the frequency band is extended. Specifically, a zero matrix is generated based on an extension ratio, and a value transformed into the frequency band is copied. For example, as illustrated in the exemplary embodiment of the present invention of FIG. 6, when quadruple extension 610 is targeted and an input image is 32×24, a 128×96 zero matrix corresponding to a quadrupling of 32×24 is generated. The generated low frequency domain is subsequently copied in a low frequency location of the 32×24 zero matrix (620).

In this instance, since only a low frequency component has a value and a remaining portion has no value, noise may occur. Accordingly, in operation S330, a preprocessing process for eliminating noise occured when extending the image in the above-described frequency domain is implemented.

Figure 7:
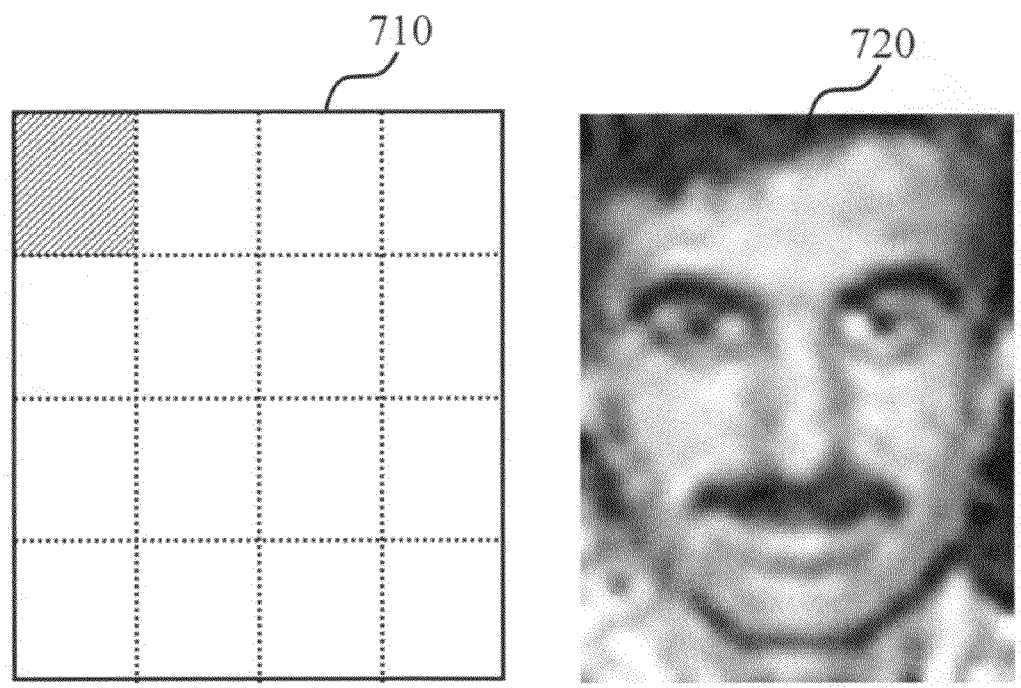

Specifically, as illustrated in FIG. 7, noise occured when extending the image (710) in the frequency domain is eliminated (720).

Figure 8:
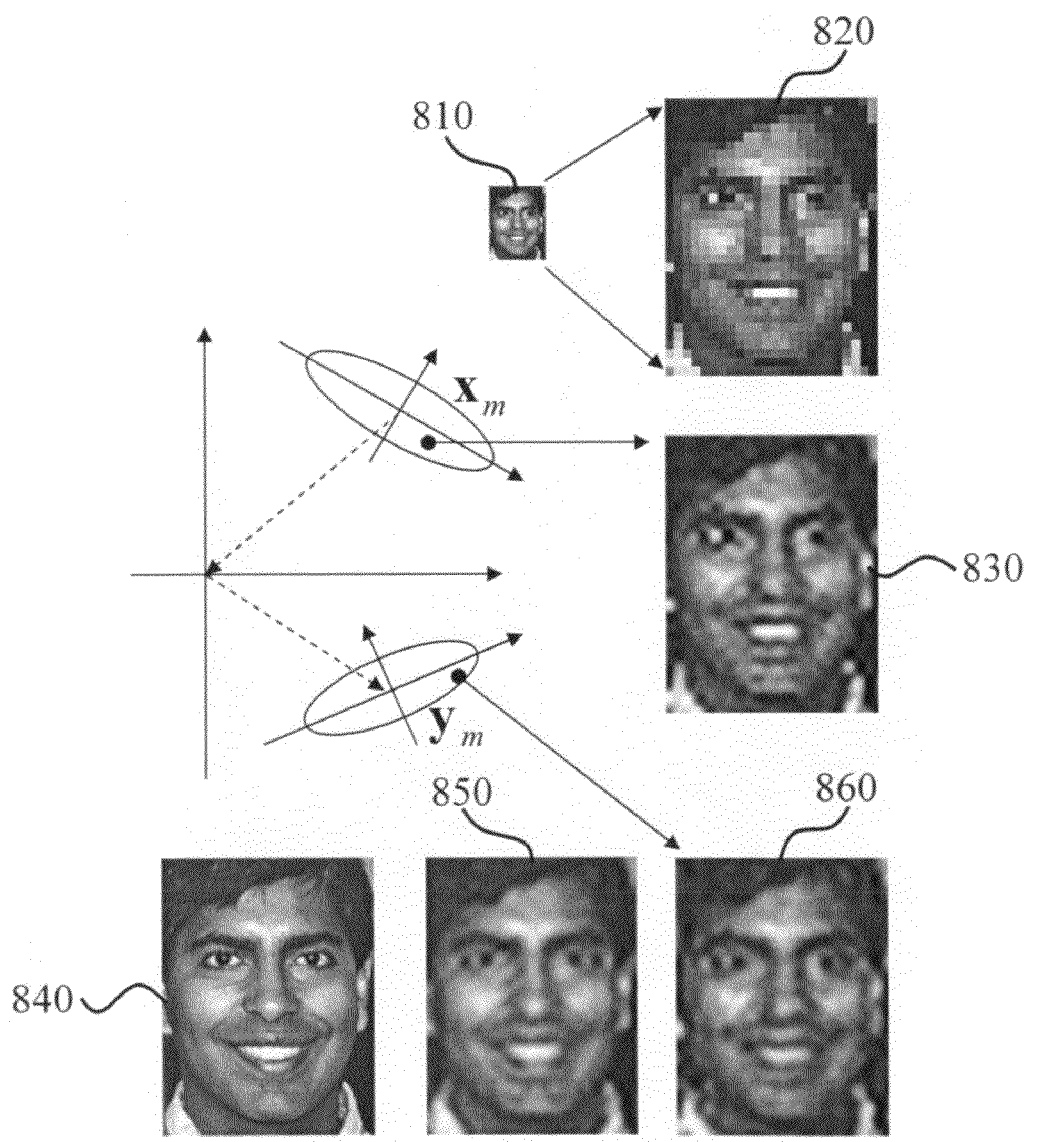

Since noise is similar to an image 30 generated without a preprocessing 830 illustrated in FIG. 8 when directly copying the low frequency component in the extended domain, the present exemplary embodiment of the present invention generates a transformation matrix eliminating noise using face data used for training.

As illustrated in FIG. 8, it may be known that an image characteristic is very different from each other in the case of the image extended using only low-resolution image information 830 and the image only extracts the same low frequency component as the input image from the original image.

When the above-described character change is denoted as x in the case of a low-resolution input image and the image with only a low-frequency component extracted from the original image is denoted as y, distribution of the low-frequency component extracted image is shown as a graph illustrated in FIG. 8. Specifically, when the distribution of the low-resolution input image is indicated by X matrix and a low-resolution portion of the original image in which noise does not exist is indicated by Y matrix, the transformation matrix may be in accordance with Equation 1 using 'SVD'.

$$X = (x_1 - x_m \; x_2 - x_m \ldots x_n - x_m)$$

$$Y = (y_1 - y_m \; y_2 - y_m \ldots y_n - y_m)$$

$$U_P^T (SVD^T) = Y$$

$$U_P^T = (SVD^T)^{-1} Y \qquad \text{[Equation 1]}$$

When the transformation matrix is generated using the above-described Equation 1, an output value of eliminating noise when a new input is inputted may be generated using Equation 2.

$$U_P^T (x - x_m) = (y - y_m)$$

$$y = U_P^T (x - x_m) + y_m. \qquad \text{[Equation 2]}$$

As illustrated in FIG. 8, it may be verified that noise having a form of cross stripes is eliminated from eye portions in an image after the preprocessing 860, compared with the image generated without the preprocessing 830.

In operation S340 and operation S350, the method subsequently restores the image via the first frequency band inference and the second frequency band inference.

Figure 4:
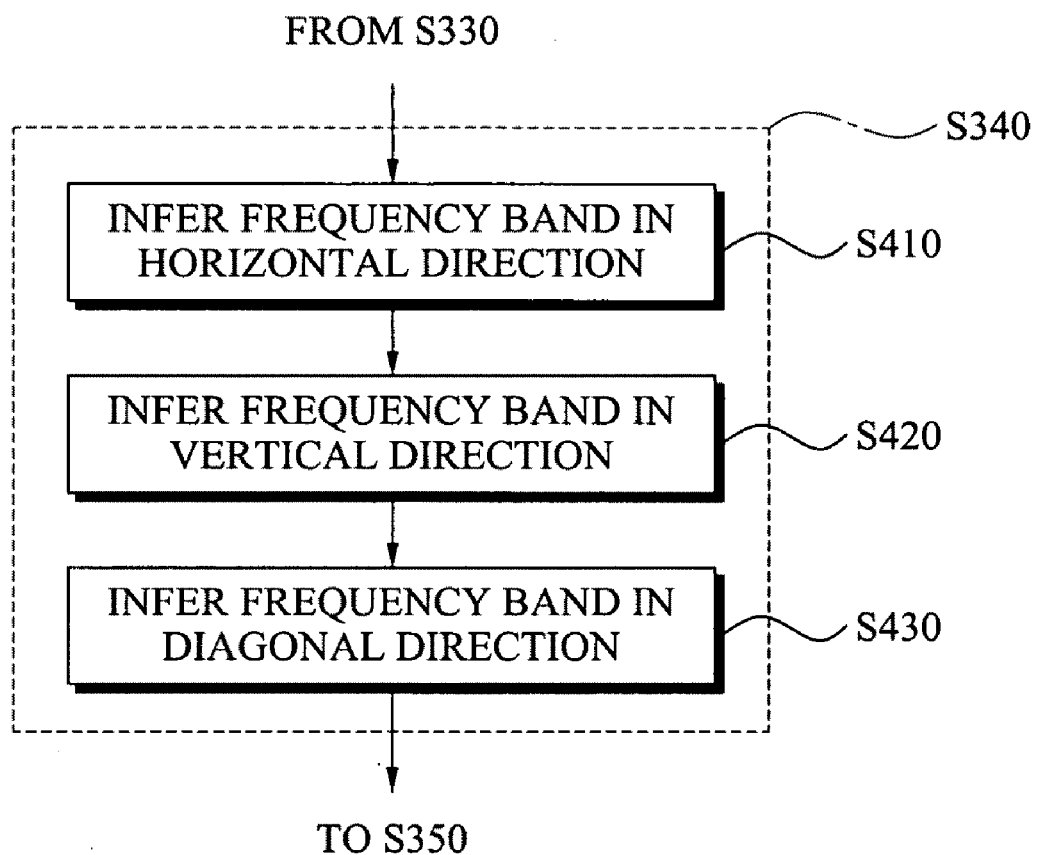
FIG. 4 is a flowchart illustrating a method of inferring a first frequency band according to an exemplary embodiment of the present invention.

FIG. 4 is a flowchart illustrating a method of inferring a first frequency band according to an exemplary embodiment of the present invention. Referring to FIG. 4, the method of inferring the first frequency band according to the present exemplary embodiment of the present invention is described.

Figure 9:
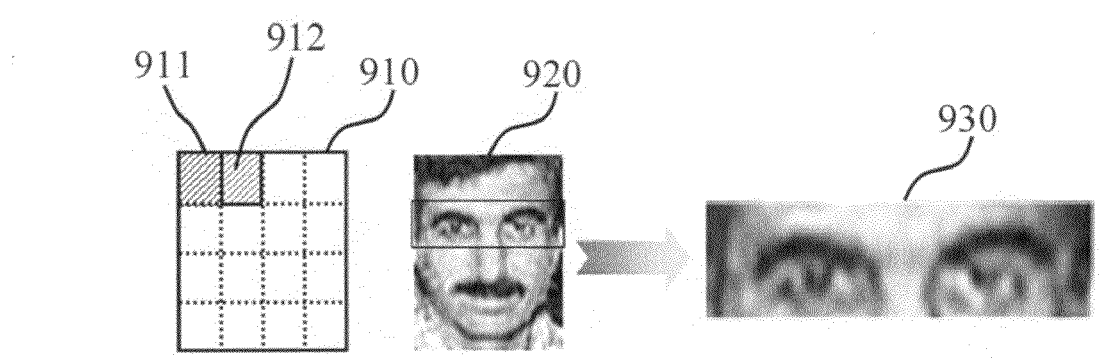
FIGS. 9 through 13 illustrate a method of inferring a first frequency band according to an exemplary embodiment of the present invention.
Figure 10:
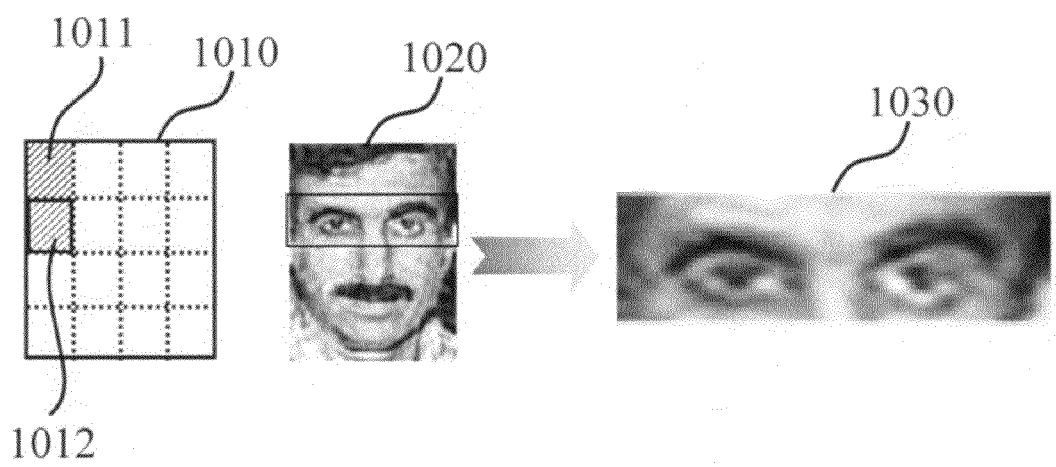
Figure 11:
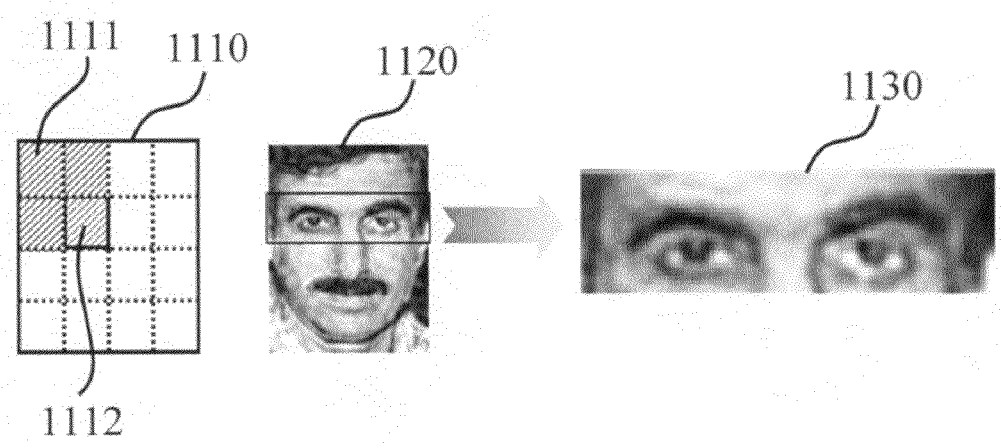

As illustrated in FIG. 9, in operation S410, a frequency band in a horizontal direction 912 from a reference block 911 is inferred after eliminating noise. As illustrated in FIG. 10, in operation S420, a frequency band in a vertical direction 1012 from a reference block 1011 is inferred. As illustrated in FIG. 11, in operation S430, a frequency band in a diagonal direction 1112 is inferred from the reference blocks 911 and 1011 using a result 1111 of inferring the frequency band in the horizontal direction and inferring the frequency band in the vertical direction.

A difference among images 920, 1020, and 1120 based on inferring the above-described frequency bands may be verified. In particular, a significant difference may be verified in images 930, 1030, and 1130 that are magnifications of eye portions of the images 920, 1020, and 1120.

The above-described inference method is described in detail below.

Figure 12:
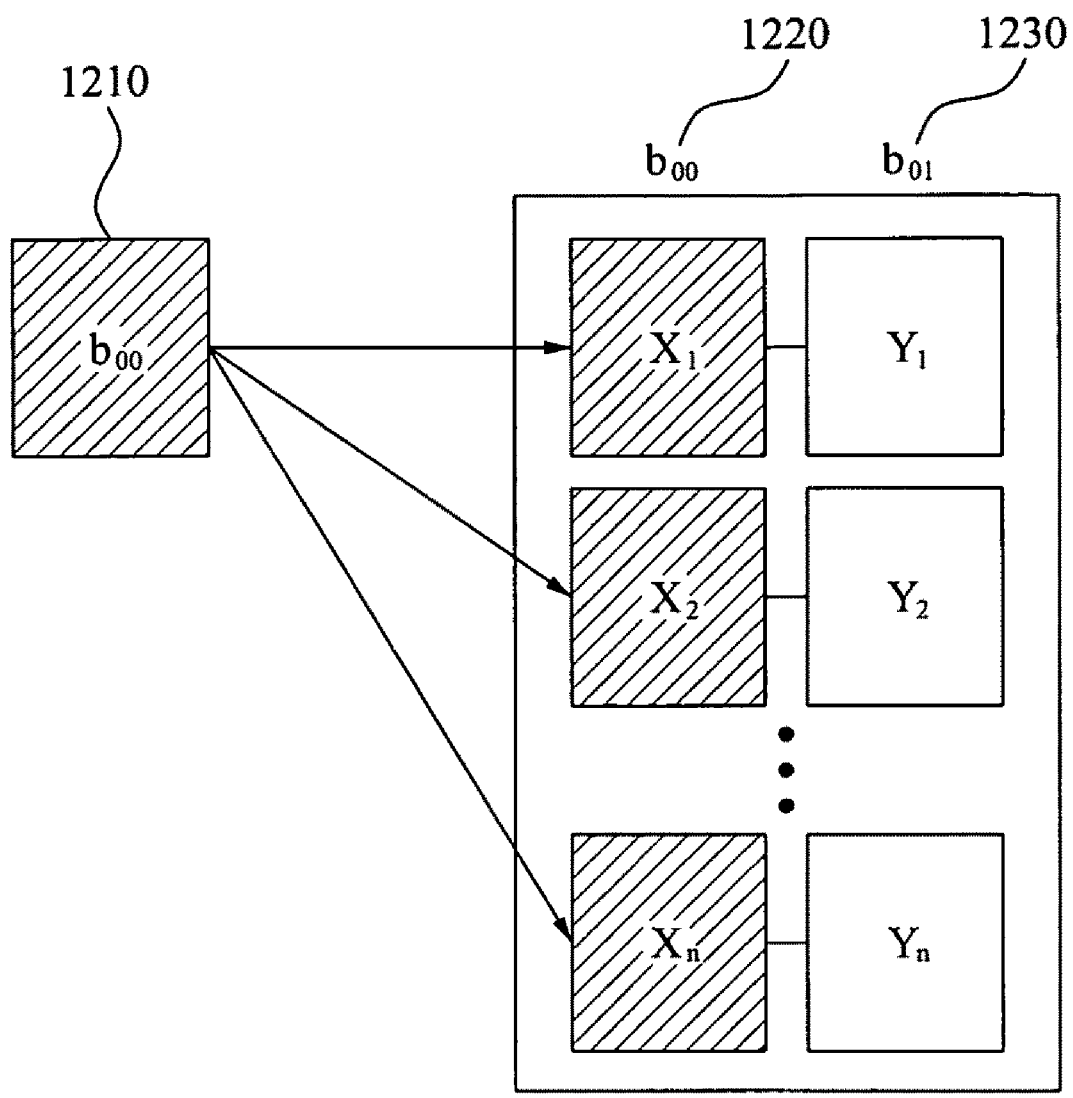

A method of inferring a peripheral high frequency component using a low-frequency input searches for a value closest to an input vector from a training database (DB), and restores high frequency information using the retrieved pair set. Specifically, as illustrated in FIG. 12, a face model is composed by setting a low-resolution portion of the face model and peripheral frequency information corresponding to the low-resolution portion as one pair. In this instance, when an input is inputted, a pair set being most similar to the input is retrieved from the training DB, and a high frequency component is copied from the retrieved set, and an operation is completed.

As illustrated in FIG. 12, value $x_{00}$ is extracted using the below Equation 3 by a process of restoring $b_{01}$ and $b_{10}$ from the training DB using restored $b_{00}$. In this instance, $U_{00}$ is a result of performing Principal Component Analysis (PCA) using only a domain $b_{00}$ of an original image. Specifically, this is a process of acquiring a coefficient value of a basis vector of $b_{00}$ by an output after generating the basis vector of $b_{00}$. The above-described basis vector reflection process does not perform a significant function in the present operation, however, a process of inferring $B_{11}$ using $b_{000110}$ by summing up $b_{00}$, $b_{01}$, and $b_{10}$ may analogize great performance since $B_{11}$ is outputted by the coefficient value of linearly summing up each value.

$$x_{00} = U_{00}{}^T(b_{00} - x_{m00}). \quad [\text{Equation 3}]$$

In the face model, the pair set is composed by a $U_{00}$ reflection coefficient value of a training set, a peripheral high frequency value $b_{01}$, or $b_{10}$, and a model $F_{00}$ of inferring $b_{01}$ is in accordance with Equation 4:

$$F_{00} = \begin{Bmatrix} x_{00}^1 & b_{01}^1 \\ x_{00}^2 & b_{01}^2 \\ \vdots & \vdots \\ x_{00}^n & b_{01}^n \end{Bmatrix}. \quad [\text{Equation 4}]$$

Similarity comparison between the face model and an input value analogizes a closest value using L1 distance, L2 distance, and the like. The above-described process is illustrated in FIG. 13.

Figure 13:
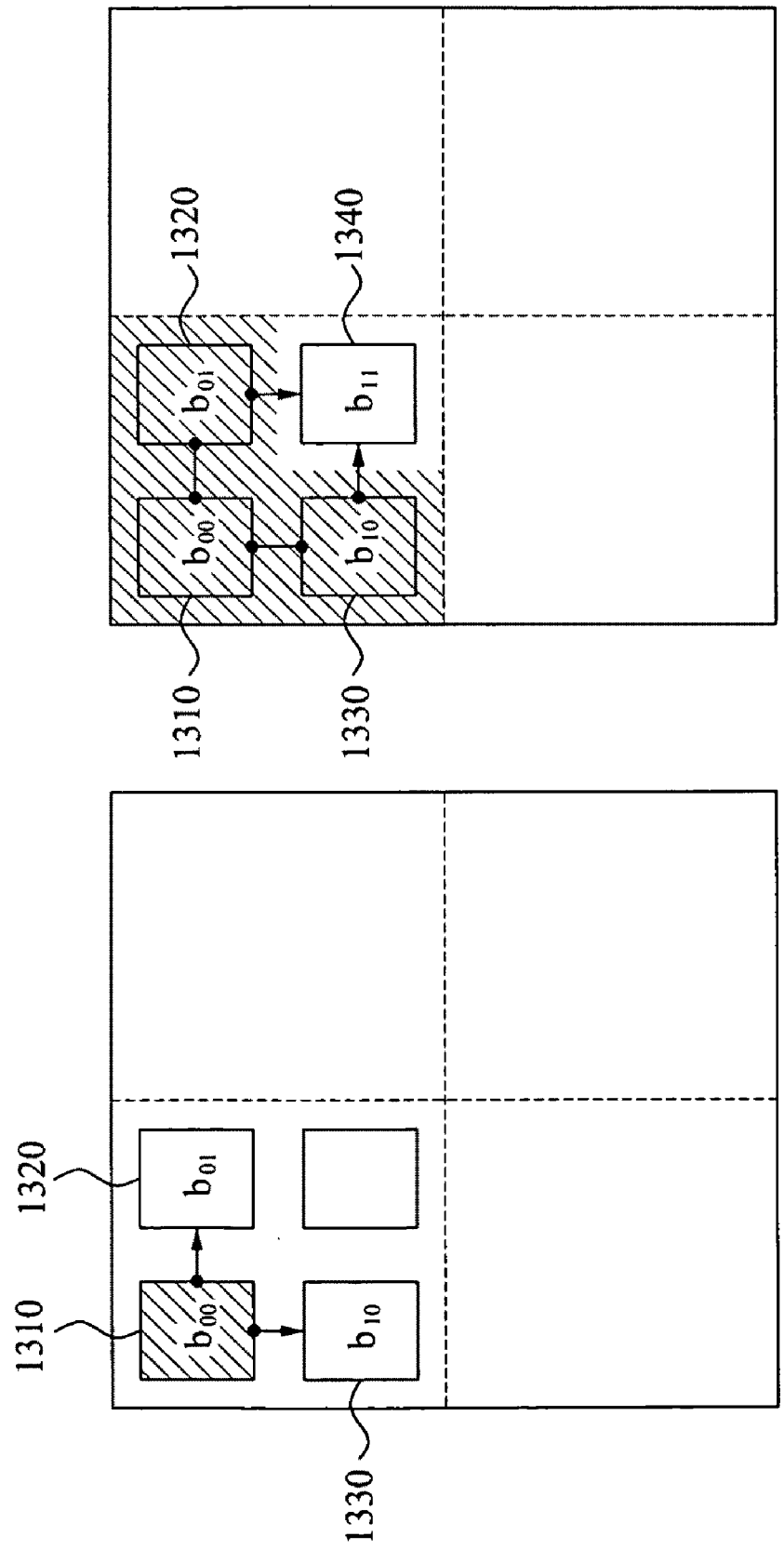

FIG. 13 illustrates a process of inferring $b_{11}$ 1340 after analogizing (inferring) $b_{01}$ 1320 and $b_{10}$ 1330. As illustrated in FIG. 13, $b_{11}$ 1340 is inferred using inferred $b_{01}$ 1320 and inferred $b_{10}$ 1330. Specifically, a high frequency value of $b_{11}$ 1340 is effectively inferred using inferred $b_{01}$ 1320 and inferred $b_{10}$ 1330. When $b_{000110}$ is assumed as a vector including $b_{00}$, $b_{01}$, and $b_{10}$, the system may be composed using $b_{000110}$ of a sum of three bands other than an individual frequency band when performing the basis vector reflection and composing the face model as described above, and may be in accordance with Equation 5. Also, for reference, analogy and inference may be used as a same or similar meaning in the present specification.

$$b_{000110} = [b_{00} \quad b_{01} \quad b_{10}]^T \quad [\text{Equation 5}]$$

$$x_{000110} = U_{000110}^T(b_{000110} - x_{m000110}).$$

$$F_{000110} = \begin{Bmatrix} x_{000110}^1 & b_{11}^1 \\ x_{000110}^2 & b_{11}^2 \\ \vdots & \vdots \\ x_{000110}^n & b_{11}^n \end{Bmatrix}.$$

In this case, a coefficient is a value of being most harmonious with $b_{00}$, $b_{01}$, and $b_{10}$, and composes the face model, and a final result value is selected.

Figure 5:
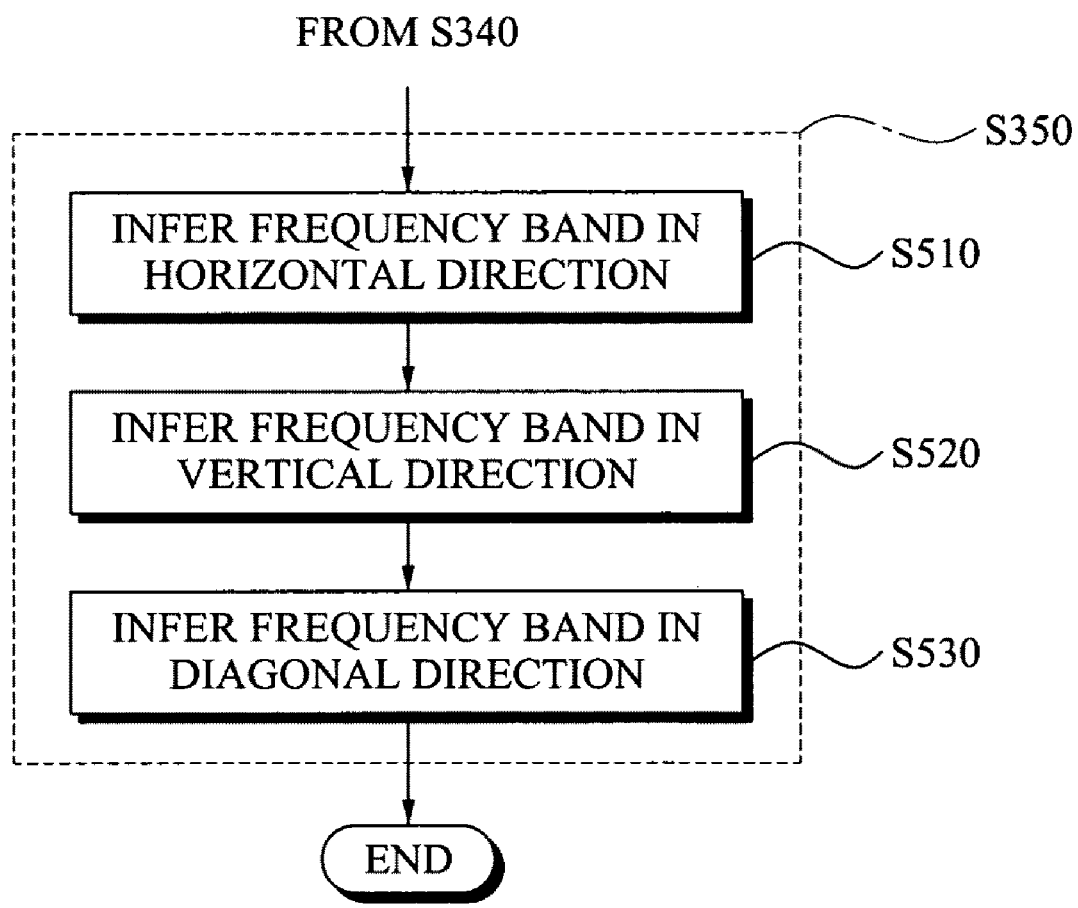
FIG. 5 is a flowchart illustrating a method of inferring a second frequency band according to an exemplary embodiment of the present invention.

FIG. 5 is a flowchart illustrating a method of inferring a second frequency band according to an exemplary embodiment of the present invention. Referring to FIG. 5, the method of inferring the second frequency band according to the present exemplary embodiment of the present invention is described.

Figure 14:
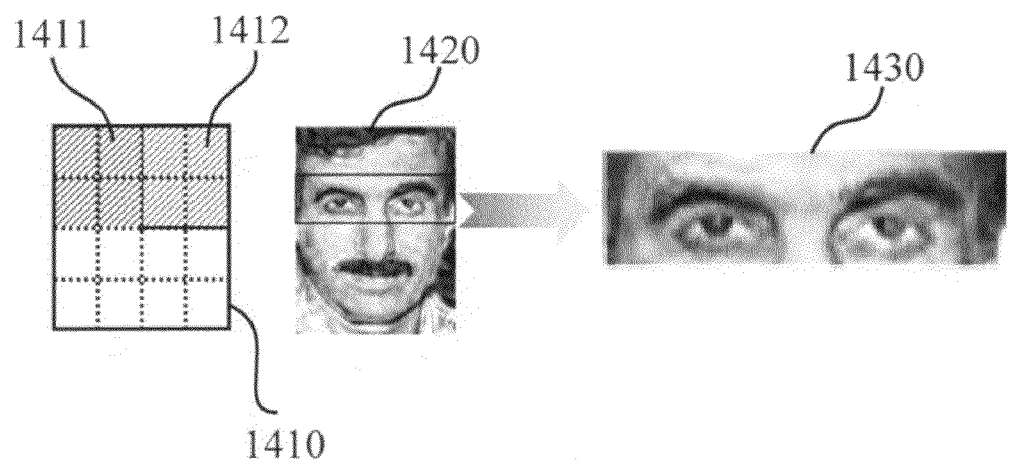
FIGS. 14 through 17 illustrate a method of inferring a second frequency band according to an exemplary embodiment of the present invention.
Figure 15:
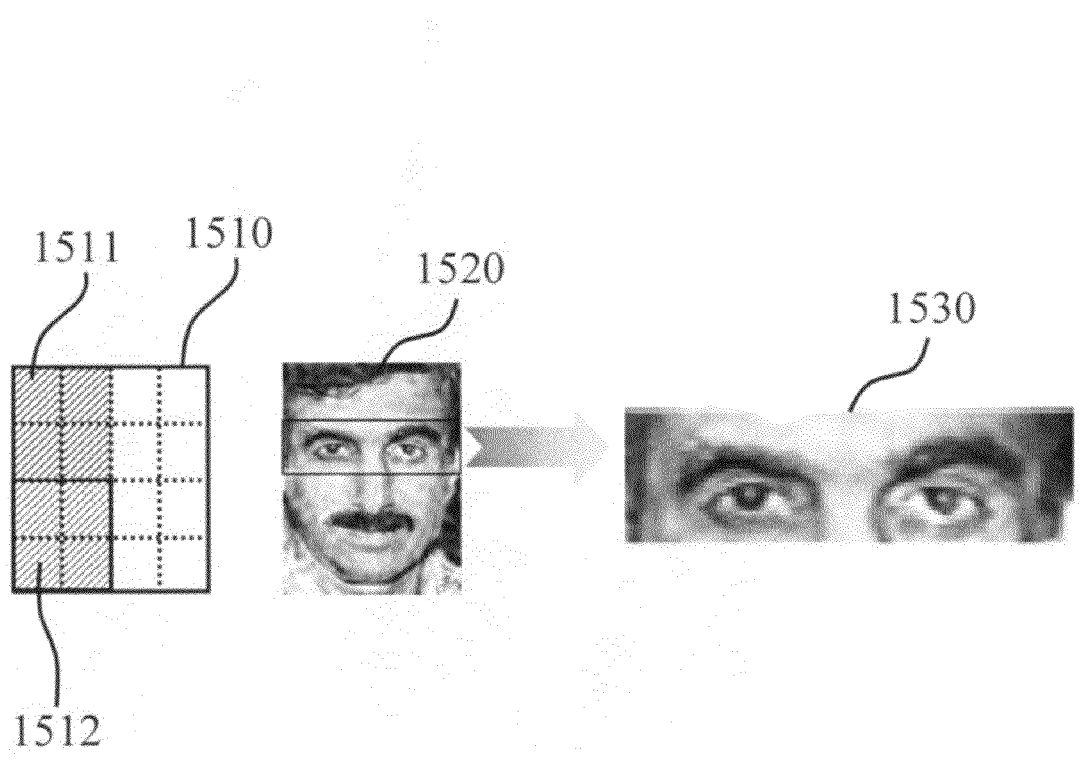
Figure 16:
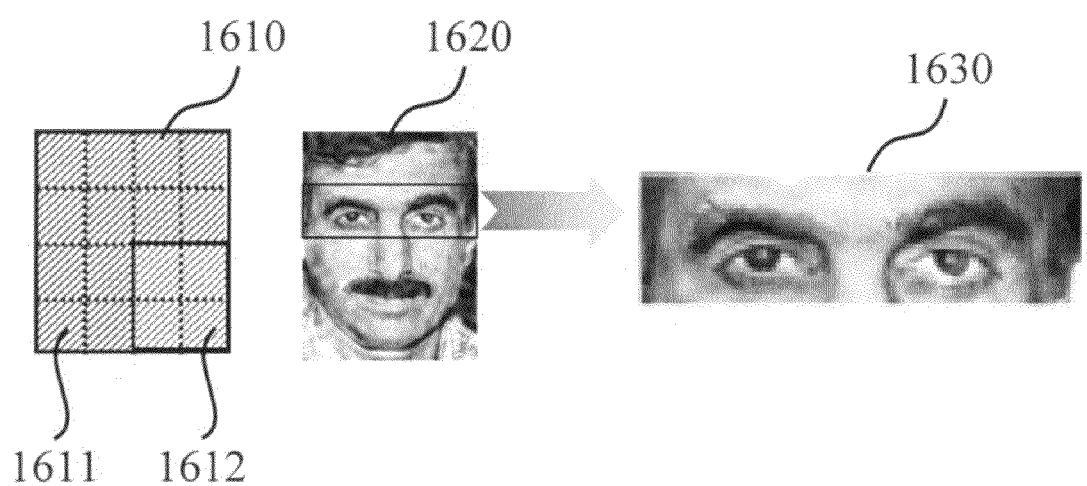

As illustrated in FIG. 14, in operation S510, a frequency band in a horizontal direction 1412 from reference blocks 1411 including four blocks is inferred. As illustrated in FIG. 15, in operation S520, a frequency band in a vertical direction 1512 from reference blocks 1511 including four blocks is inferred. In operation S530, a frequency band in a diagonal direction 1612 from the reference blocks 1411 and 1511 is inferred using a result 1611 of inferring the frequency band in the horizontal direction and inferring the frequency band in the vertical direction.

Figure 17:
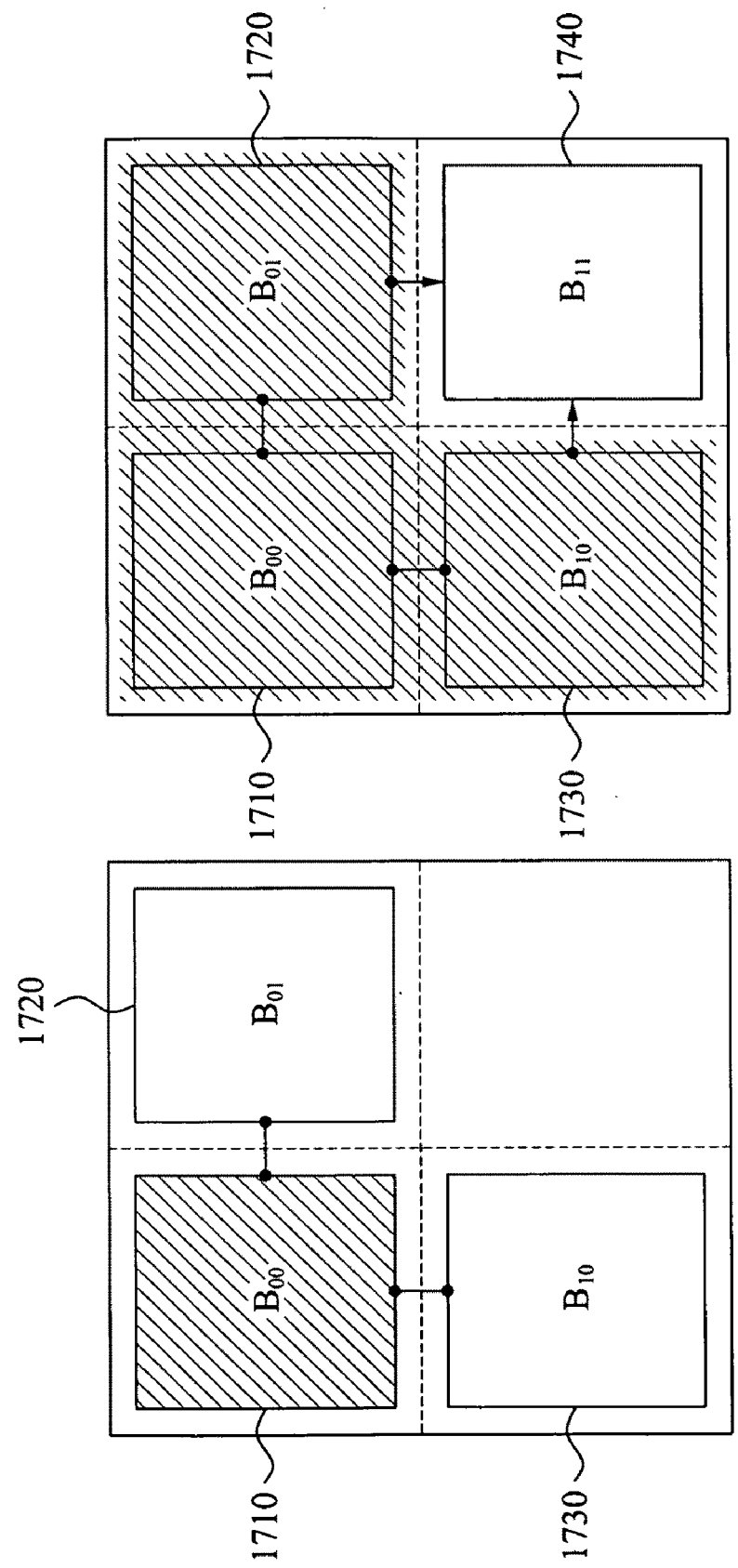

A high frequency band of remaining domains 1720 and 1730 is inferred, similar to the method of inferring the first frequency band after matching by extracted information $B_{00}$ 1710 illustrated in FIG. 17 using the method of inferring the first frequency band illustrated in FIG. 4. Also, a high frequency value of $B_{11}$ 1740 may be effectively analogized using analogized $B_{01}$ 1720 and analogized $B_{10}$ 1730.

The method of inferring the second frequency band according to the present exemplary embodiment of the present invention is same as the method of inferring the first frequency band according to an exemplary embodiment of the present invention, however, this is an inference method of replacing only a basis vector and a face model.

The method of inferring the second frequency band is performed by Equation 6:

$$B_{00} = [b_{00} \quad b_{01} \quad b_{10} \quad b_{11}]^T \quad [\text{Equation 6}]$$

$$\bar{x}_{00} = \bar{U}_{00}^T(B_{00} - \bar{x}_{m00})$$

$$\bar{F}_{00} = \begin{Bmatrix} \bar{x}_{00}^1 & B_{01}^1 \\ \bar{x}_{00}^2 & B_{01}^2 \\ \vdots & \vdots \\ \bar{x}_{00}^n & B_{01}^n \end{Bmatrix}.$$

Figure 18:
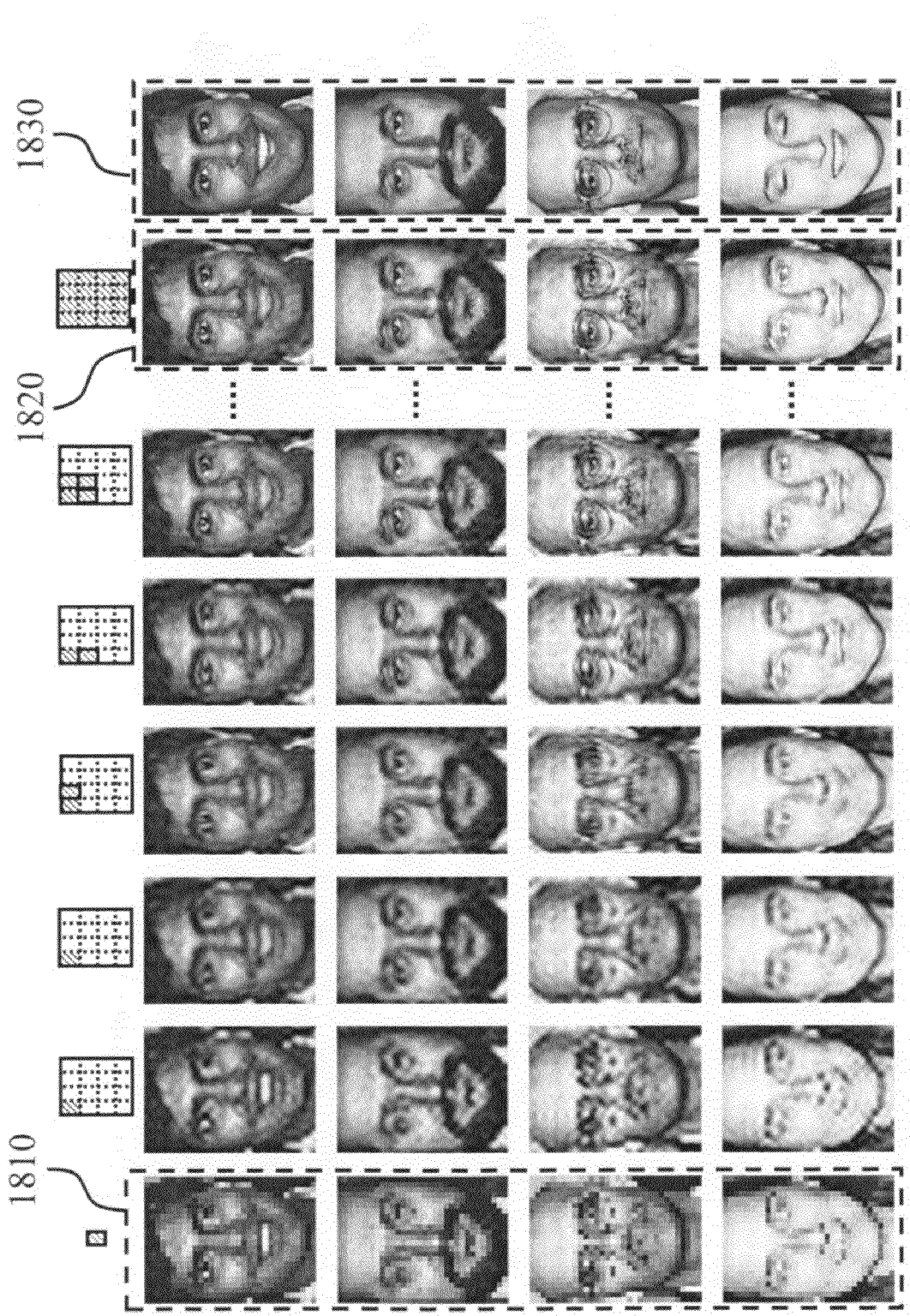
FIG. 18 illustrates an example of image restoration using a frequency-based image model according to an exemplary embodiment of the present invention

FIG. 18 illustrates an example of image restoration using a frequency-based image model according to an exemplary embodiment of the present invention.

In the example illustrated in FIG. 18, since an image model being expressionless with eyes open is used, a smiling face is mapped with a face when not smiling, and a facial image with eyes closed is mapped with a facial image with eyes open.

Specifically, when a face model is a full face being expressionless with eyes open, a face characteristic most similar to an original image 1830 is copied and restoration image 1820 is possible even when a face of an image entered by an input image 1810 is behind a mask or has closed eyes. Accordingly, even when a security camera photographs a facial image at a long distance and an identity may not be recognized using the photographed facial image, a low-resolution facial image may be restored into a high-resolution facial image using only a single image.

Also, according to the present invention, since normalization is performed using only two eye-coordinates, it is resistant to noise, and since an input image is corrected from a low resolution, it is resistant to an image character change. Since a frequency band is sequentially restored, discontinuity of blocks shown in a conventional art may be eliminated.

The exemplary embodiments of the present invention include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of restoring an image using a frequency-based image model, the method comprising:
   transforming an original image into a frequency domain and generating a transformation image;
   copying the transformation image in any one block of blocks in which the original image is extended; and
   inferring a high frequency component of remaining blocks, and restoring the block using the transformation image copied in the any one block,
   wherein the inferring and restoring comprises:
   inferring a high frequency component of a block located in a horizontal direction based on the transformation image, and restoring the block;
   inferring a high frequency component of a block located in a vertical direction based on the transformation image, and restoring the block; and
   inferring a high frequency component of a block located in a diagonal direction based on the transformation image using the high frequency components of the block located in the horizontal direction and the vertical direction, and restoring the block.

2. The method of claim 1, wherein the inferring and restoring infers the high frequency component of a remaining block, and restores the block using a low frequency component of the transformation image.

3. The method of claim 1, further comprising:
   eliminating frequency distortion noise that occurs when copying the original image transformed into the frequency band, into the extended domain being divided into the blocks.

4. The method of claim 1, wherein the inferring and restoring infers the high frequency component of the block domains, and restores the block based on information found by searching for a value closest to an input vector of the transformation image from a database.

5. The method of claim 1, wherein the original image is extended by a zero matrix.

6. The method of claim 1, further comprising:
   inferring the high frequency component using the restored block by replacing at least one of a basis vector and a face model, and restoring the block.

7. A method of restoring an image using a frequency-based image model, the method comprising:
   transforming an original image into a frequency domain and generating a transformation image; and
   restoring a block and inferring a high frequency component block by extending based upon the transformation image,
   wherein the inferring and restoring comprises:
   inferring a high frequency component of a block located in a horizontal direction based on the transformation image, and restoring the block;
   inferring a high frequency component of a block located in a vertical direction based on the transformation image, and restoring the block; and
   inferring a high frequency component of a block located in a diagonal direction based on the transformation image using the high frequency components of the block located in the horizontal direction and the vertical direction, and restoring the block.

8. The method of claim 7, wherein the inferring and restoring infers the high frequency component of a remaining blocks, and restores the block using a low frequency component of the transformation image.

9. A system for restoring an image using a frequency-based image model, the system comprising:
   an image transformation unit to transform an original image into a frequency band and generate a transformation image;
   an image copying unit to copy the transformation image in any one block of blocks in which the original image is extended and in which are divided into blocks; and
   an image restoration unit to infer a high frequency component of block, and restore the block using the transformation image copied in the any one block,
   wherein the image restoration unit
   infers a high frequency component of a block located in a horizontal direction based on the transformation image, and restores the block,
   infers a high frequency component of a block located in a vertical direction based on the transformation image, and restores the block, and infers a high frequency component of a block located in a diagonal direction based on the transformation image using the high frequency components of the block located in the horizontal direction and the vertical direction, and restores the block.

10. The system of claim 9, wherein the image restoration unit infers the high frequency component of the block, and restores the block using a low frequency component of the transformation image.

11. The system of claim 9, further comprising:

a noise elimination unit to eliminate frequency distortion noise that occurs when copying the original image transformed into the frequency band, in the extended domain being divided into the blocks.

12. The system of claim 9, wherein the image restoration unit infers the high frequency component of the block, and restores the block based on information found by searching for a value closest to an input vector of the transformation image from a database.

13. The system of claim 9, wherein the image restoration unit infers the high frequency component of the block using the restored block by replacing at least one of a basis vector and a face model, and restores the block.

14. A non-transitory computer-readable recording medium storing a program for implementing a method of restoring an image using a frequency-based image model, the method comprising:

transforming an original image into a frequency domain and generating a transformation image;

copying the transformation image in any one block in which the original image is extended; and inferring a high frequency component of blocks, and restoring the block using the transformation image copied in the any one block, wherein the inferring and restoring comprises:

inferring a high frequency component of a block located in a horizontal direction based on the transformation image, and restoring the block;

inferring a high frequency component of a block located in a vertical direction based on the transformation image, and restoring the block; and inferring a high frequency component of a block located in a diagonal direction based on the transformation image using the high frequency components of the block located in the horizontal direction and the vertical direction, and restoring the block.

\* \* \* \* \*

UNITED STATES PATENT AND TRADEMARK OFFICE
CERTIFICATE OF CORRECTION

PATENT NO.         : 8,189,948 B2
APPLICATION NO.    : 12/216705
DATED              : May 29, 2012
INVENTOR(S)        : Won Jun Hwang et al.

It is certified that error appears in the above-identified patent and that said Letters Patent is hereby corrected as shown below:

Column 10, Line 13, in Claim 3, delete "into the" and insert -- in the --, therefor.

Signed and Sealed this
Twenty-seventh Day of November, 2012

David J. Kappos
*Director of the United States Patent and Trademark Office*